United States Patent [19]

Rossio et al.

[11] Patent Number: 4,929,375

[45] Date of Patent: May 29, 1990

[54] CONVEYOR LUBRICANT CONTAINING ALKYL AMINE COUPLING AGENTS

[75] Inventors: Charles E. Rossio, Carleton; Wladyslaw W. Koziol, Ann Arbor, both of Mich.

[73] Assignee: Diversey Corporation, Ontario, Canada

[21] Appl. No.: 218,893

[22] Filed: Jul. 14, 1988

[51] Int. Cl.$^5$ .......................................... C10M 173/02
[52] U.S. Cl. ................................. 252/49.3; 252/48.2; 252/50; 252/51.5 A; 252/56 R
[58] Field of Search .................................. 252/49.3, 50

[56] References Cited

U.S. PATENT DOCUMENTS

| | | | |
|---|---|---|---|
| 3,507,792 | 4/1970 | Zuraw | 252/49.3 |
| 3,583,914 | 6/1971 | Garvin et al. | 252/49.3 |
| 3,860,521 | 1/1975 | Aepli et al. | 252/49.3 |
| 4,274,973 | 6/1981 | Stanton et al. | 252/49.3 |
| 4,390,439 | 6/1983 | Schwartz et al. | 252/49.3 |
| 4,486,324 | 12/1984 | Korosec | 252/49.3 |
| 4,604,220 | 8/1986 | Stanton | 252/49.3 |
| 4,759,861 | 7/1988 | Ogura et al. | 252/49.3 |
| 4,769,162 | 9/1988 | Remus | 252/49.3 |
| 4,787,995 | 11/1988 | Nichols et al. | 252/49.3 |
| 4,802,998 | 2/1989 | Mueller et al. | 252/49.3 |

*Primary Examiner*—William R. Dixon, Jr.
*Assistant Examiner*—E. McAvoy
*Attorney, Agent, or Firm*—Arnold S. Weintraub; Anne G. Sabourin

[57] ABSTRACT

A conveyor lubricant concentrate for the purpose of lubricating conveyors which includes an alkyl amine solubilizer for solubilizing fatty acids in solution.

22 Claims, No Drawings

CONVEYOR LUBRICANT CONTAINING ALKYL AMINE COUPLING AGENTS

BACKGROUND OF THE INVENTION

1. Field of the Invention

The present invention relates to conveyor lubricants. More particularly, the present invention concerns the use of alkyl amines in conveyor lubricant compositions. Even more particularly, the present invention concerns concentrates containing an alkyl amine as a coupling agent and conveyor lubricants prepared therefrom.

2. Prior Art

In breweries, soft drink bottling operations and food processing plants, conveyors are used to move the bottles, jars, cans, and the like along the line. In order to keep the conveyor chains clean and provide lubrication, it is customary to use a lubricant, such as an aqueous soap-based lubricant or an alpha olefin sulfonate-based lubricant. The lubricant compositions, also, include chelating agents to prevent precipitation of calcium and magnesium ions. These lubricants are, generally, manufactured and sold as concentrates which must be diluted with soft water, at the point of use, wherein the dilution factor is generally 1 part lubricant to 100 parts water.

Both the water soluble soaps and the alpha olefin sulfonates conveyor lubricants present certain disadvantages. The water soluble soap lubricant, when dissolved in hard water will precipitate as the calcium or magnesium salt of the fatty acid. This precipitate forms an undesirable greasy-type film which must be removed from the conveyor equipment. Also, soaps lack resistance to acid. When contacted with an acid, the soap is converted back to the free fatty acid which is insoluble. The free fatty acids, will accumulate as a greasy soil on both the conveyor and the beverage container. This is quite often the case in the bottling of acidic products such as beer, soft drinks and pickles, as the beverage or brine may overflow or the container may break.

As noted, both the water soluble soap and alpha olefin sulfonate conveyor lubricants have a conventional dilution factor of 100 parts water to 1 part concentrated lubricant. The various solubilizers utilized in the water soluble soap lubricant and the alpha olefin sulfonate lubricant have limited solubilizing ability thereby limiting the amount of active ingredient which can be employed in prior art conveyor lubricant use solutions, thus, creating added expense, vis-a-vis, the amount of lubricant needed to lubricate.

Representative of prior art soap based lubricants is found in U.S. Pat. No. 4,274,973; U.S. Pat. No. 3,860,521. Representative of prior art alpha olefin sulfonate lubricant is U.S. Pat. No. 4,604,220.

The present invention, as will subsequently be detailed, obviates many of the drawbacks associated with the prior art.

SUMMARY OF THE INVENTION

The present invention provides a fatty acid-based concentrate for forming a conveyor lubricant, as well as the conveyor lubricant, which contains an alkyl amine as the coupling agent for the fatty acid. The alkyl amine is utilized to couple long-chain fatty acids in the conveyor lubricant formula. The alkyl amine contemplated for use herein, ordinarily, has a carbon chain length between 8 and 10. Particularly useful are the $C_8$ tertiary amines.

Generally, the concentrate will contain from about 3 percent to about 10 percent, by weight, of the alkyl amine. The alkyl amine is used in conjunction with an additional coupling agent, such as an alkyl aryl sulfonate. Generally, the concentrate will contain between about 10 percent and about 30 percent by weight of the additional coupling agent, based on the total weight.

The concentrate will, also, include a carrier for the fatty acid-alkyl amine solubilized composition. The carrier is, usually, water. However, water soluble solvents such as alkanols, polyhydric alcohols and the like may be admixed with the fatty acid-alkyl amine composition in lieu of water, or the concentrate may contain water and other solvent. Also, sequestrants, corrosion inhibitors and the like may be employed.

The addition of the alkyl amine to the lubricant improved lubricity and results in a significantly more effective concentrate. In comparison to soap-based and alpha-olefin sulfonate lubricants much less of the concentrate of the present invention is needed to form the lubricant from concentrate.

Conventional lubricants are formed by diluting lubricant concentrates with water in a ratio of 1 part concentrate to 100 parts water. The alkyl amine concentrate may be diluted with water to form effective lubricants in a respective weight ratio up to from about 1 part concentrate to 3000 parts of water. Remarkably, even though significantly more dilute than conventional lubricants the alkyl amine containing lubricant provides equal or improved lubricity.

For a more complete understanding of the present invention reference is made to the following detailed description and accompanying examples.

DETAILED DESCRIPTION OF THE PREFERRED EMBODIMENT

In accordance with the present invention and as noted hereinabove, conveyor cleaner-lubricants are prepared from alkyl amines.

It has been unexpectedly discovered that conveyor lubricants having alkyl amines incorporated therein exhibit greatly enhanced lubricity. By using an alkyl amine, greater amounts of the fatty acid may be incorporated into the lubricant to enhance lubricity. The resulting alkyl amine containing lubricant is a clear, stable lubricant having a high fatty acid content.

The formulation of the present invention utilizes a reduced amount of the alkyl amine coupling agent, in comparison to couplers of other lubricant formulations. Also, the resulting lubricant concentrate can be used in greatly reduced concentrations with water to form the lubricant. Remarkably, even though the solution is 30 times more dilute, the formula demonstrates increased lubricity over conventional lubricants. Additionally, it appears that this improved lubricity results in substantial reduction of stress cracks, especially where water is the solvent, in polyethylene bottles being filled on conveyor systems.

The alkyl amine solubilizing agent employed herein is a compound capable of combining with additional solubilizing or coupling agents to solubilize a fatty acid mixture in the diluent to provide enhanced solubility of the fatty acids in the lubricant concentrate and consequently an unexpected increase in lubricity under use conditions. Alkyl amine compounds have been found to have greater solubilizing ability than conventional solubilizing agents. Additionally, the alkyl amine solubilizing agents remain clear and stable over a broad range of temperatures from about $-10°$ F. to about $120°$ F.

Various primary, secondary and tertiary alkyl amines can be successfully employed in this invention. The alkyl amine solubilizing agents useful herein are, preferably, tertiary amines having the general formula:

where R equals CnH2n+1 where n has a value between 8 and 10. Representative of the useful alkyl amine compounds are, decyl dimethyl amine, N,N-dimethyl octyl amine, octyl amine, nonyl amine, decyl amine, ethyl octyl amine, ethyl hexyl amine, and 2-ethyl-1-hexamine and the like, as well as mixtures thereof.

The tertiary alkyl amines are preferred as they provide the most stable coupling agents for the long-chain fatty acids utilized in the conveyor lubricant formulas. The particularly preferred alkyl amine is N,N dimethyl octyl amine, as it provides enhanced solubility and excellent stability in the lubricant. The alkyl amines contemplated for use herein are commercially available from Ethyl Corporation sold under the trade name ADMA 8 Amine.

In preparing a conveyor lubricant in accordance herewith an alkyl amine containing concentrate containing from about 2 parts to about 10 parts by weight, and, preferably, from about 3 parts to about 6 parts by weight of the alkyl amine is utilized.

Combined in solution with the alkyl amine is a second or additional solubilizing or coupling agent.

The second coupling agent may be an alkyl aryl sulfonate and, in particular, diphenyl disulfonate which is the sodium salt of diphenyl disulfonic acid. The diphenyl disulfonate preferred, herein, is sold under the trade name Dowfax 3B2 ® and is commercially available from Dow Chemical Corporation. The second coupling agent combines with the alkyl amine, and acts to couple the fatty acid into solution in the lubricant formula. The second coupling agent is present in an amount ranging from about 10 parts by weight to about 30 parts by weight based on the total weight of the concentrate.

The concentrate, also, utilizes a carrier, wherein the preferred and usual carrier is water.

It is also possible, where glassware, only is to be lubricated, to use as a carrier for the alkyl amine, a water soluble solvent such as an alkanol or polyhydric alcohol. Also, a water-soluble solvent may be mixed with water to define the vehicle carrier.

Representative solvents include, for example, ethanol, propanol, butanol, ethylene glycol, propylene glycol, diethylene glycol, and the like, as well as mixtures thereof.

Where the solvent is used, alone or in admixture with water, the same amounts defined above are employed.

The carrier is present in amounts between about 30 and about 75 parts by weight.

The lubricant formula also comprises a long-chain fatty acid comprising a carboxylic acid having from about 12 to about 22 carbon atoms in the alkyl portion thereof. The fatty acid may be either a saturated or unsaturated fatty acid or a mixture of saturated and unsaturated fatty acids. The fatty acid is present in an amount between 0.5 parts and 15 parts by weight based on total concentrate weight.

Representative of, but not limited to, the fatty acids which may be used are coconut oil fatty acid, lauric acid, myristic acid, palmetic acid, oleic acid, linoleic acid, linolenic acid and mixtures thereof. Any one of these fatty acids names may be used separately or in a mixture in the lubricant formulation. The preferred fatty acid for the lubricant formula is a mixture of coconut oil fatty acid and oleic acid. In the mixture the oleic and coconut oil fatty acids are each generally present in an amount between about 0.25 parts and about 15 parts by weight based on total concentrate weight and preferably between about 0.25 parts and about 7 parts by weight based on total concentrate weight.

The lubricant concentrate may also contain a hardness sequestrant, for the purpose of sequestering Mg+ and Ca+ ions present in the water. The sequestrant may comprise either an organic or inorganic sequestrant. Useful organic sequestrants are alkali metal salts of ethylene diamine tetraacidic acid (EDTA), gluconic acid, phosphonic acid, or nitrilotriacetic acid (NTA) and the like. Examples of inorganic sequestrants are the phosphate hardness sequestrants, such as sodium tripolyphosphate. Although any of the enumerated sequestrants may be effectively integrated herein, preferably, the alkali metal salt of EDTA is employed. Na4EDTA sold under the trade name Versene ® and available from Dow Chemical Corporation is utilized herein. Where used, the hardness sequestrant is present in an amount of between about 2 and about 15 parts by weight based on total concentrate weight.

The lubricant concentrate is prepared by combining water with the second coupling agent and heating the mixture to a temperature of 120° F. The 120° F. temperature is maintained throughout the mixing process. The sequestering agent, alkyl amine and fatty acids are subsequently added in the order given, to the solution, mixing well after the addition of each.

As hereinabove noted, to form a use solution, the present concentrate is diluted with water in a, respectively, weight ratio, ranging from about 1:100 to about 1:3000.

For a more completely understanding of the present invention reference is made to the following illustrative examples. In the example all parts are by weight absent contrary indications.

EXAMPLE I

A conveyor lubricant in accordance with the present invention was prepared by mixing together, in a suitable container, water and a second coupling agent at 120° F. Thereafter, with mixing, the additional ingredients were added. The ingredients employed and their respective amounts are shown below.

|  | Parts by Weight |
| --- | --- |
| Water | 62 |
| Diphenyl Disulfonic Acid (DOWFAX 3B2) | 25 |
| Na EDTA (versene) | 5 |
| Dimethyl Octylamine | 2 |
| Oleic Acid | 4 |
| Coconut Oil Fatty Acid | 2 |

The lubricant concentrate so prepared exhibited excellent lubricity when diluted with water at a ratio of 300:1.

EXAMPLE II

Following the procedure of Example I a lubricant concentrate was prepared from the following:

|                        | Parts by Weight |
|------------------------|-----------------|
| Water                  | 43              |
| Diphenyl Disulfonic Acid | 30            |
| Na EDTA (Versener)     | 5               |
| Dimethyl Octylamine    | 8               |
| Oleic Acid             | 7               |
| Coconut Oil Fatty Acid | 7               |

Having thus disclosed the present invention, what is claimed is:

1. An aqueous conveyor lubricant composition concentrate consisting essentially of:
   (a) a carrier selected from the group consisting of water, alkanols, a polyhydric alcohol; and mixtures thereof; and
   (b) a first solubilizing agent consisting essentially of an alkyl tertiary amine having between 8 and 10 carbon atoms; and
   (c) a fatty acid selected from the group consisting of C12 to C22 saturated and unsaturated carboxylic acids and mixtures thereof;
   (d) a second solubilizing agent selected from the group consisting of alkyl aryl sulfonates; and
   (e) a harness sequestering agent.

2. The conveyor lubricant of claim 1 wherein the alkanol is selected from the group consisting of: ethanol, propanol, butanol, ethylene glycol, propylene glycol, and diethylene glycol, and mixtures thereof.

3. The aqueous conveyor lubricant of claim 1 wherein:
   (a) the carrier is present in an amount from about 30 parts and about 75 parts by weight based on total concentrate weight;
   (b) the a tertiary alkyl amine solubilizing agent is present in an amount from between about 2 parts to about 10 parts by weight of total concentrate weight; and
   (c) the fatty acid is present in an amount of between about 0.5 parts to about 15 parts by weight based on total concentrate weight.

4. The aqueous conveyor lubricant of claim 3 wherein the tertiary alkyl amine solubilizing agent is selected from the group consisting of: decyl dimethyl amine, dimethyl octyl amine, and mixtures thereof.

5. The aqueous conveyor lubricant concentrate of Claim 4 wherein the fatty acid is a mixture of saturated and unsaturated fatty acids wherein the fatty acids are selected from the group consisting of: oleic, linoleic, linolenic, lauric, myristic, palmetic and coconut oil fatty acids and mixtures thereof.

6. The aqueous conveyor lubricant concentrate of claim 1 wherein the hardness sequestering agent is selected from the group consisting of: the alkali metal salts of ethylene diamine tetraacetic acid (EDTA), gluconic acid, phosphonic acid, or nitrilotriacetic acid (NTA).

7. The aqueous conveyor lubricant concentrate of Claim 9 wherein the sequestrant is present in an amount of between about 2 parts to about 15 parts by weight based on total weight of the concentrate.

8. The aqueous conveyor lubricant concentrate of claim 4 wherein the a tertiary alkyl amine solubilizing agent is N,N-dimethyl octyl amine.

9. The aqueous conveyor lubricant concentrate of claim 5 wherein the fatty acid composition is a mixture of coconut oil fatty acid and oleic acid.

10. The aqueous conveyor lubricant concentrate of claim 1 wherein the alkyl aryl sulfonate is diphenyl disulfonate.

11. The aqueous conveyor lubricant concentrate of claim 6, wherein the sequestrant is NaEDTA.

12. An aqueous conveyor lubricant concentrate composition comprising:
   (a) water present in an amount of between about 30 parts and about 75 parts by weight based on total concentrate weight; and
   (b) N,N-dimethyl octyl amine present in an amount between about 2 parts to about 10 parts by weight of the total weight of concentrate; and
   (c) a fatty acid mixture of coconut oil fatty acid present in an amount between about 0.25 parts and about 7 parts by weight based on total concentrate weight and oleic acid present in an amount between about 0.25 parts and about 7 parts by weight based on total concentrate weight;
   (d) diphenyl disulfonate present in an amount between about 10 parts and about 30 parts by weight based on total weight of concentrate;
   (e) the sodium salt ethylene diamine tetraacetic acid as a hardness sequestering agent present in an amount between about 2 parts and about 15 parts by weight based on total concentrate weight.

13. A process for forming an aqueous conveyor lubricant concentrate composition comprising the following steps:
   (a) heating a carrier in an amount between about 43 parts and about 62 parts by weight of total concentrate together with an alkyl aryl sulfonate present in an amount between 10 parts and about 30 parts by weight total concentrate to a temperature of 120° F.; and
   (b) adding to the carrier-sulfonate solution a hardness sequestering agent present in an amount between 1 part and 5 parts by weight total concentrate; and
   (c) adding to the solution an alkyl a tertiary amine present in an amount between 2 parts and about 10 parts by weight based on total concentrate; and
   (d) admixing therewith fatty acid present in an amount between about 0.5 to about 15 percent by weight; and
   (e) heating the total mixture with stirring to a temperature of 120° F. until a homogenous solution is formed.

14. The process of claim 14 wherein the carrier is water.

15. The process of claim 13 wherein the alkyl aryl sulfonate is a diphenyl disulfonate.

16. The process of claim 13 wherein the hardness sequestering agent is NaEDTA.

17. The process of claim 13 wherein the a tertiary alkyl amine is dimethyl octyl amine.

18. The process of claim 13 wherein the fatty acid comprises a mixture of fatty acids selected from the group consisting of lauric, myristic, palmetic, coconut oil fatty acid and oleic, linoleic, and linolenic acids and mixtures thereof.

19. The process of claim 13 wherein the fatty acid is present in an amount between 0.5 parts and about 15 parts by weight per total concentrate weight.

20. The fatty acid mixture of claim 13 wherein the fatty acid comprises a mixture of oleic acid and coconut oil fatty acid.

21. The fatty acid mixture of claim 13 wherein the oleic acid is present in an amount between about 0.25 parts and about 7 parts by weight of total concentrate weight and the coconut oil fatty acid is present in an amount between 0.25 parts and 7 parts by weight of total concentrate weight.

22. A conveyor lubricant comprising (a) the concentrate of claim 1 and (b) water wherein the lubricant concentrate is added to water in a ratio of concentrate to water ranging from about 1:100 to about 1:3000.

* * * * *

UNITED STATES PATENT OFFICE
CERTIFICATE OF CORRECTION

Patent No. 4,929,375　　　　　　　　　　Dated　May 29, 1990

Inventor(s)　　　Charles Rossio

It is certified that error appears in the above-identified patent and that said Letters Patent is hereby corrected as shown below:

Col. 1, line 27, before "conveyor" delete "sulfonates" and insert --sulfonate--.

Col. 6, line 39, after "alkyl" delete "a".

Col. 6, line 54, before "tertiary" delete "a".

Signed and Sealed this

Fifteenth Day of October, 1991

Attest:

HARRY F. MANBECK, JR.

*Attesting Officer*　　　　　　*Commissioner of Patents and Trademarks*